United States Patent [19]

Kanda et al.

[11] Patent Number: 5,228,394
[45] Date of Patent: Jul. 20, 1993

[54] PROCESSING APPARATUS FOR FOOD MATERIALS

[75] Inventors: Takeshi Kanda, Hyogo; Kazunobu Fujinuma, Tsukuba; Toshikatsu Naoi, Kobe; Yasuhiko Inoue, Kobe; Yoshihiko Sakashita, Kobe; Yoshihisa Sawada, Nishinomiya, all of Japan

[73] Assignee: Kabushiki Kaisha Kobeseikosho, Kobe, Japan

[21] Appl. No.: 785,873

[22] Filed: Nov. 1, 1991

[30] Foreign Application Priority Data

| Nov. 2, 1990 | [JP] | Japan | 2-298060 |
| Nov. 22, 1990 | [JP] | Japan | 2-320034 |
| Jan. 23, 1991 | [JP] | Japan | 3-006534 |

[51] Int. Cl.$^5$ ............................................. A23L 1/00
[52] U.S. Cl. ..................................... 99/453; 60/910; 99/275; 99/467; 99/471; 99/483
[58] Field of Search ................. 99/275, 276, 461, 468, 99/472, 471, 473–475, 483, 484, 485, 452, 453; 422/295, 291; 60/910; 426/521

[56] References Cited

U.S. PATENT DOCUMENTS

| 2,115,921 | 5/1938 | Steiner | 60/910 |
| 2,230,760 | 2/1941 | Pescara | 60/910 |
| 3,599,556 | 8/1971 | Madsen | 99/472 |
| 3,908,537 | 9/1975 | Bajcar et al. | 99/472 |
| 3,991,667 | 11/1976 | Stenne | 99/452 |
| 4,506,599 | 3/1985 | Wojciechowski | 99/467 |
| 4,579,049 | 4/1986 | Rodrigues | 99/289 R |
| 4,592,274 | 6/1986 | Tomatis | 99/452 |
| 4,700,899 | 10/1987 | Powers et al. | 99/472 |
| 4,765,233 | 8/1988 | Genchev et al. | 99/584 |
| 4,767,632 | 8/1988 | Meier | 99/280 |
| 4,797,296 | 1/1989 | Meier et al. | 99/289 R |
| 4,850,270 | 7/1989 | Bronnert | 99/443 C |

FOREIGN PATENT DOCUMENTS 289877 3/1990 Japan.

Primary Examiner—Timothy F. Simone
Attorney, Agent, or Firm—Oblon, Spivak, McClelland, Maier & Neustadt

[57] ABSTRACT

A pressure processing method and processing apparatus for sterilization, denaturation, etc. of food materials include a free piston fitted in a pressure container so that the free piston is slidable in an axial direction of the container, the pressure container being partitioned by the free piston into two chambers to prevent mixing and contact between a material to be processed and a pressure medium. The material to be processed filled in and supplied to one chamber is pressure-processed by the sliding movement of the piston caused by supplying the pressure medium to the other chamber. Three or more pressure containers, in each of which is fitted a free piston, are provided, and a series of processing operations including pressurizing and holding, discharge and supply of the material to be processed are carried out in a batch continuous manner in the same time zone.

5 Claims, 4 Drawing Sheets

PROCESSING APPARATUS FOR FOOD MATERIALS

FIELD OF THE INVENTION AND RELATED ART STATEMENT

The present invention relates to a pressure processing method and processing apparatus for food materials, particularly, for liquid food materials having a flowability under high pressure for the purpose of sterilization. denaturation and the like.

Processing of food has been usually carried out by means of heat.

Recently, however, pressure has become to be positively utilized. As one example of pressure utilization for food processing, a biaxial extruder can be mentioned. This is intended for denaturation and organization of food to the utmost by mechanical function of temperature, kneading shearing, etc, and pressure is not intentionally controlled but varies with properties of food. For example, high pressure, for example, such as 1000 kgf/cm$^2$ cannot be applied.

In view of the foregoing, there has been proposed the technique in which a cold isostatic pressing apparatus is used so that a pressure medium such as water is supplied to a pressurizing chamber inside a high pressure container and pressurized to thereby apply isostatic pressure to a material to be processed within a processing chamber to process the same.

In this case, when food material is processed, it is necessary to separate the liquefied material to be processed from the pressure medium to prevent them from being mixed. As the separation means, most generally, there can be mentioned a method for using a bag such as a vacuum pack (prior art 1) and a method for the separation by a flexible wall (prior art 2) as already disclosed in Unexamined Japanese Patent Publication HEI 2-89877.

OBJECT AND SUMMARY OF THE INVENTION

In the aforementioned prior art 1 in which the bag such as a vacuum pack is used to prevent a mixture and contact between the material to be processed and the pressure medium, the pressure processing within the container is of the batch system, which has a problem in that the utilization efficiency of container volume lowers in terms of productivity and economy.

Moreover, in the handling of food which is filled and sealed in a pliable bag such as a plastic bag, after preprocessing, and then charged into a pressure container, the bag is liable to be broken and the sealability thereof tends to be degraded since the bag is formed of a pliable material.

On the other hand, in the prior art 2 in which the flexible wall is suspended on the upper lid of the pressure container, food is filled in the wall and then a pressurizing force is applied to the pressure medium, there is a problem in that in consideration of problem of durability, sealability, etc. of the wall, mixture and contact between the liquid material to be processed (food) and the pressure medium caused by the incomplete seal often occur. Furthermore, there is a problem in that it is difficult to completely discharge the material to be processed from the wall, that it is necessary to supply germ-free gas for the complete discharge thereof, and that cycle time is long.

A first object of the present invention is to provide a pressure processing method and processing apparatus for food materials wherein a pressure container liquid-tightly houses therein a free piston which is slidable axially of the container, whereby the container is partitioned into one pressure medium chamber and the other chamber for receiving a material to be processed by said free piston to prevent mixture and contact between the pressure medium and the material to be processed, in which state the pressurizing processing of the liquid food material can be effected with improved volume rate and improved productivity.

A second object of the present invention is to provide a processing method and apparatus particularly suitable for drinking food such as natural fruit juice. That is, natural fruit juice tends to undergo occurrence of off-flavor, change into brown, loss of nutritious component, etc., easily resulting in a lowering of quality by the usual thermal processing. The present invention provides a pressure processing method and processing apparatus wherein heating processing is not applied but high pressure processing is applied whereby yeast and mold which are the cause of decomposition are perished at atmospheric pressure of 2 to 4,000. At that time, the fruit juice component is not effected but can be maintained fresh in color and smell without being heated. A third object of the present invention is to provide a pressure processing method and apparatus wherein at least three pressure containers are provided series of operations including pressure-holding, discharge and supply of a material to be processed can be carried out in a batch continuous manner at the same time in said pressure containers, and cleanliness necessary for handling food can be secured by utilization of water as pressure medium.

A fourth object of the present invention is to provide a pressure processing method and processing apparatus for food materials wherein sterilization is effected before the pressure medium is supplied into a pressure container to thereby guarantee a sanitary property.

A fifth object of the present invention is to provide a pressure processing method and apparatus for food materials wherein a free piston can be pulled out of a pressure container, and water as pressure medium is supplied into the pressure container to clean the latter whereby in the pressure processing of different materials to be processed, the materials to be processed are not mixed and the sanitary property can be assured.

A sixth object of the present invention is to provide a pressure processing method and apparatus for food materials which can effectively utilize pressurized energy.

For achieving the aforementioned objects, the present invention is characterized in that a pressure container houses therein a free piston slidable axially of said container, a pressure medium chamber and a chamber for receiving a material to be processed are partitioned from each other by said piston, a pressure medium is supplied to the pressure medium chamber in the state in which the material to be processed is filled in said receiving chamber to pressurize and slidably move the free piston, and said pressurized state is maintained for a predetermined period of time.

The present invention is further characterized in that at least three pressure containers are provided in the first of said pressure containers, a material to be processed is filled in and supplied to said one chamber from a supply device while removing the pressure medium with respect to the free piston within said container; in the second pressure container, keeping pace with said filling and supply of the material to be processed, the material to be processed being supplied to one chamber of said container is pressurized by applying the pressure-medium pressure to the free piston; and in the third pressure container, keeping pace with said pressurization, the material to be processed already subjected to the pressure processing within said container is taken into a recovery device by the sliding movement of the free piston within the container in an axial direction of the container caused by the supply of the pressure medium. The present invention is further characterized in that a branch line connected to each of said one chambers is provided in a pressure-medium supplying common line of the pressure-medium supply and discharge device, an opening and closing valve is provided on each of said branch lines, a bypass line for discharge of pressure medium is connected to the branch line between each of said opening and closing valve and said one chamber, an opening and closing valve is provided on said bypass line, a branch line connected to each of said other chambers is provided on a common supply line of the supply device for the material to be processed, an opening and closing valve is provided on each of said branch lines, a recovering bypass line connected to said recovery device is provided on the branch line between each of said opening and closing valves and said other chamber, and an opening and closing valve is provided on each of said bypass lines.

The advantages and functions other than the aforementioned objects of the present invention will become apparent from the ensuing description with reference to the drawings.

DESCRIPTION OF THE PREFERRED EMBODIMENTS

Figure 1:
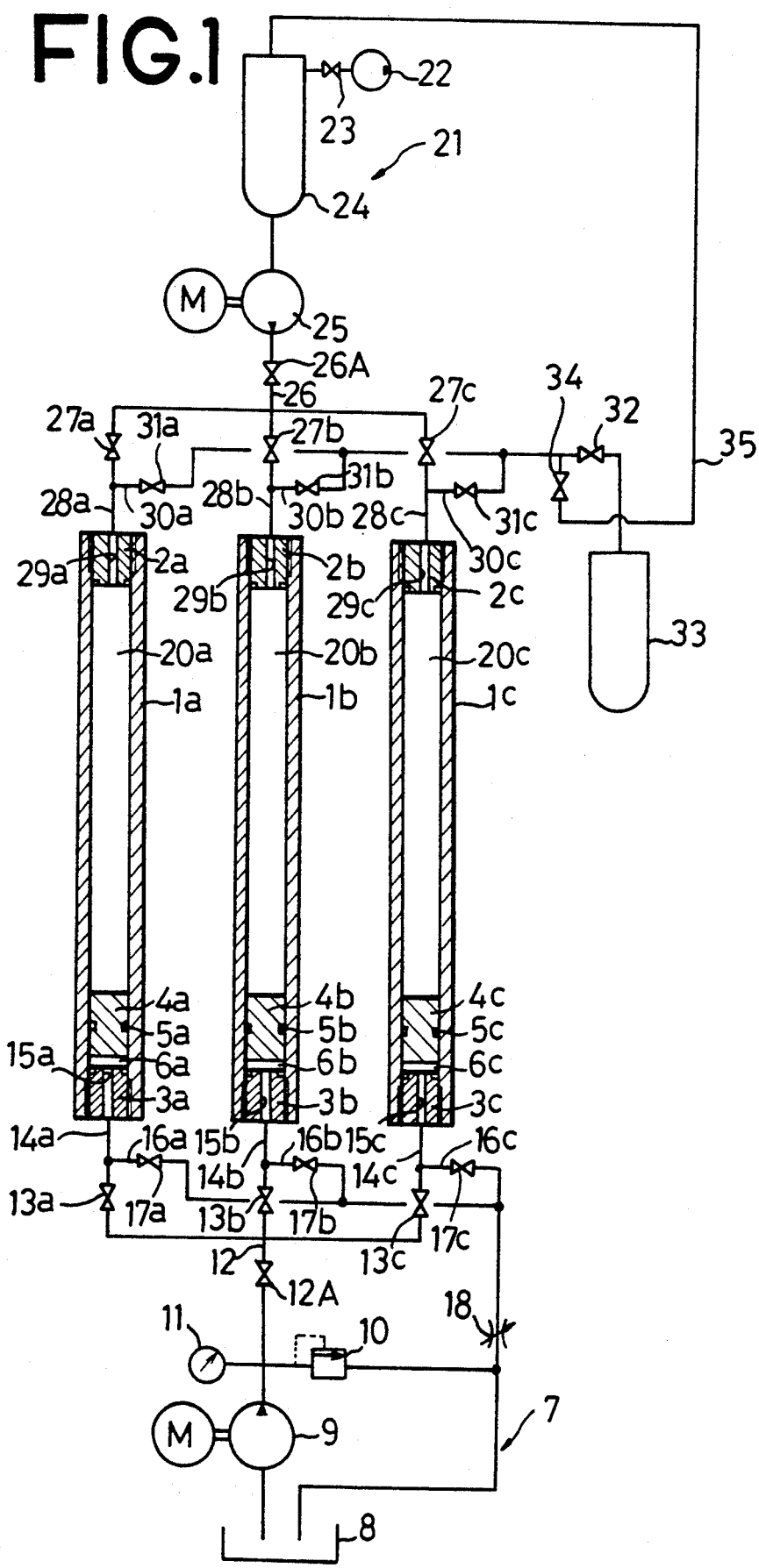
FIG. 1 is an elevation view prior to operation according to a first embodiment of the present invention.

In FIG. 1 showing a first embodiment of the present invention, three pressure containers 1a, 1b and 1c are provided in this example. Each of the pressure containers 1a, 1b and 1c is opened in its axial opposite ends, and both these openings are detachably provided with closing members 2a, 2b and 2c and closing members 3a, 3b and 3c, respectively, and sealed through seal constructions or the like. Since the axial force acts on these closing members 2a-2c and 3a-3c, there can be employed, in order to bear the axial force, the thread fitting construction with respect to the opening of the pressure container as shown, the spaced thread fitting construction, for example, in consideration of convenience of in and out of the material to be processed, or a bearing construction for holding the closing members 2a-2c and 3a-3c by a press frame.

The pressure containers 1a-1c are interiorly provided slidably with free pistons 4a, 4b and 4c provided with seal members 5a, 5b and 5c, respectively. A pressure-medium supply and discharge device 7 is connected in common to one chambers (pressure medium chambers) 6a, 6b and 6c in the pressure chambers 1a-1c divided into two chambers by the free pistons 4a-4c, said device 7 having a pressure regulating portion.

The pressure medium supply and discharge device 7 sucks a pressure medium from a pressure medium tank 8 by the action of a pressurizing pump 9 to pressurize it through a pressure regulating valve 10, the pressure medium capable of being supplied to pressure medium chambers 6a-6c via a pressure medium supplying common line 12 having an opening and closing valve 12A, branch lines 14a, 14b and 14c and having opening and closing valves 13a, 13b and 13c branched from the line 12, and through holes 15a, 15b, 15c provided in the closing members 3a-3c. Pressure medium discharging bypass lines 16a, 16b and 16c are connected to branch lines 14a-14c between the opening and closing valves 13a-13c and the pressure medium chambers 6a-6c. The lines 16a-16c have opening and closing valves 17a, 17b and 17c, respectively, and enable reduction in pressure of the pressure medium chambers 6a, 6b and 6c and recovery of the pressure medium into the pressure medium tank 8 via a throttle valve 18. In pressurizing and supplying of pressure medium, in case of relatively low pressure, an electric pump can be used as shown, and in case of high pressure, for example, a hydraulically-operated booster type can be used. However, a combination of these can be used in which a low pressure pump is used for pressurization at the time of low pressure, whereas a booster is used for pressurization at the time of high pressure. In FIG. 1, reference numeral 11 denotes a pressure gauge provided on a pressure medium supply system. In setting a pressurizing force, a method can be employed in which a pressurizing pump and a booster are stopped by a signal from the pressure gauge.

Further, as a device 21 for supplying a material to be processed into other chambers (chambers for receiving material to be processed) 20a, 20b and 20c, there is provided a common line 26 having an opening and closing valve 26A for supplying a material to be processed by a supply pump 25 from a tank for supplying a material to be processed 24 provided with a defoaming (air removing) vacuum pump 22 through an opening and closing valve 23. Branch lines 28a, 28b and 28c having opening and closing valves 27a, 27b and 27c are connected to the common line 26 so that liquid materials to be processed, for example, such as juice, milk, etc. as food materials, are supplied to the chambers for receiving material to be processed 20a-20c through the through-holes 29a, 29b and 29c provided in the closing members 2a-2c.

As the route for discharging the already processed material to be processed, recovering bypass lines 30a, 30b and 30c are connected to the branch lines 28a-28c between the opening and closing valves 27a-27c and the chambers 20a-20c, said lines 30a-30c having opening and closing valves 31a, 31b and 31c. There is provided a route extending to a recovery device 33 indicated by a tank via these opening and closing valves 31a-31c and 32. An opening and closing valve 34 is a bypass valve which prevents the material to be processed which has leaked from the opening and closing valves 31a-31c from being mixed into the recovery device 33, the material being circulated to the tank for supplying material to be processed 24 through a pipeline 35.

As materials for constituting these devices, stainless steel is generally recommended to be preferable for pressure containers, valves, pipes, etc. in view of handling food materials. Water is recommended to be preferable for pressure medium.

Figure 2:
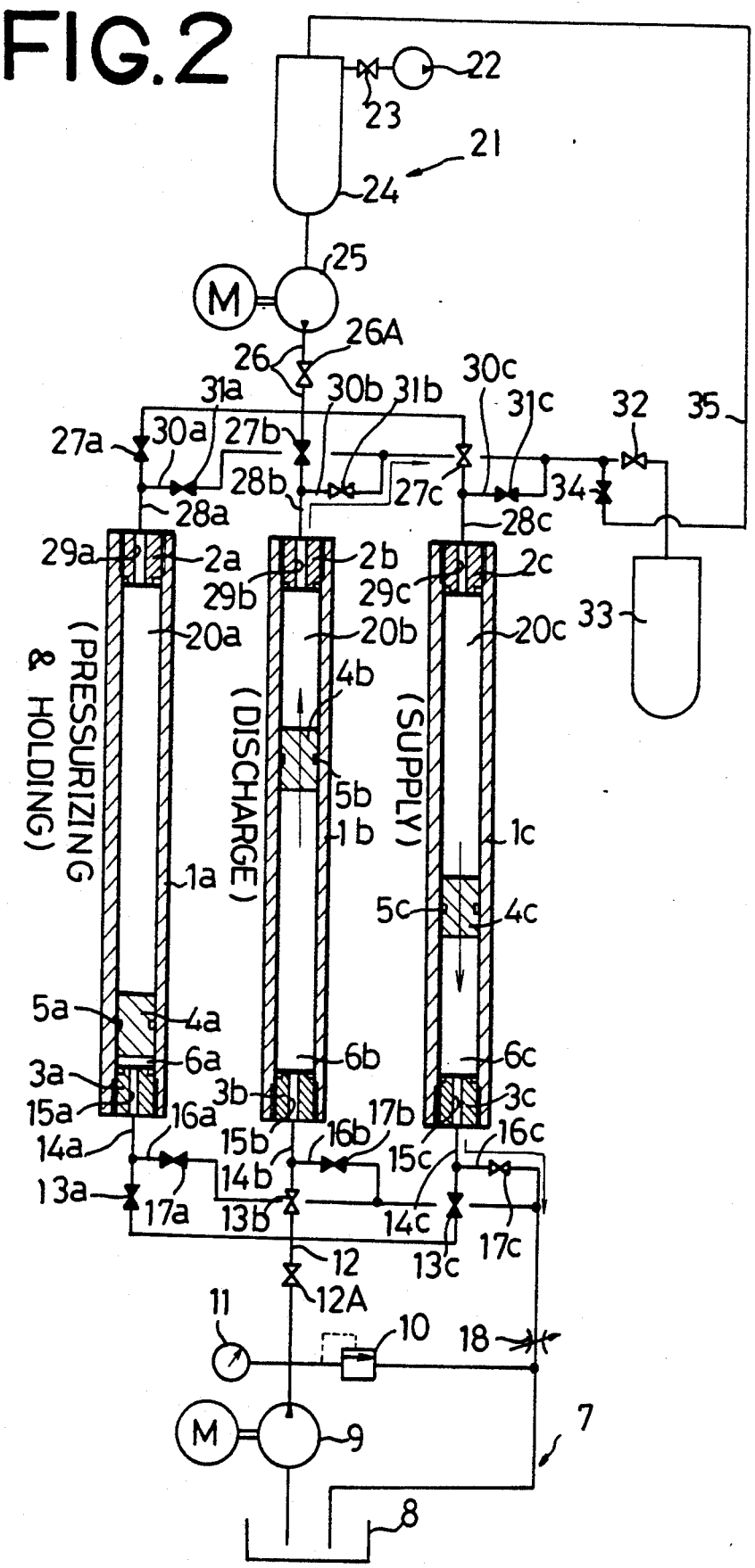
FIG. 2 is an elevation view showing one example of the operating state.

With the aforementioned structure, the method according to the present invention will be described with reference to FIG. 2. In FIG. 2, the white-colored valves are open, and the black-colored valves are closed. That is, in the pressure container 1a, with respect to materials to be processed received in the chamber for receiving material to be processed, i.e., liquid food such as juice, milk, sake (Japanese liquor), etc., pressure medium is supplied to a further pressure medium chamber 6a. The pressure medium raises the free piston 4a, and in the state in which the opening and closing valves 13a, 17a, 27a and 31a all the pipe lines connected to the pressure container 1a are closed, the pressurizing holding is carried out for 5 to 20 minutes, for example, under the atmospheric pressure of 2-4,000. At the time of said pressurizing holding, in the pressure container 1b, the discharge of the material to be processed which has already subjected to the pressurizing holding (recover it into the recovery device 33), is carried out. In this case, the discharge of material is carried out by opening the opening and closing valves 13b and 31b, supplying the pressure medium resulting from the drive of the pressure pump 9, and moving upward the free piston 4b. The opening and closing valves 17b and 27b are closed. On the other hand, in the pressure container 1c, the opening and closing valves 27c and 17c are open and the opening and closing valves 31c and 13c are closed during that period. The supply pump 25 for material to be processed is driven to slidably move the free piston 4c downward (discharge of pressure medium) with the result that the material to be processed is supplied to the chamber for receiving material to be processed 20c.

More specifically, in the respective pressure containers, the pressurizing holding, discharge and supply of materials to be processed are simultaneously carried out, and the batch continuous repeated operation is carried out so as to keep pace with three operations within the same time in the following order.

Pressure container 1a: pressurizing holding→discharge→supply

Pressure container 1b: discharge→supply→pressurizing holding

Pressure container 1c: supply→pressurizing holding→discharge

Figure 3:
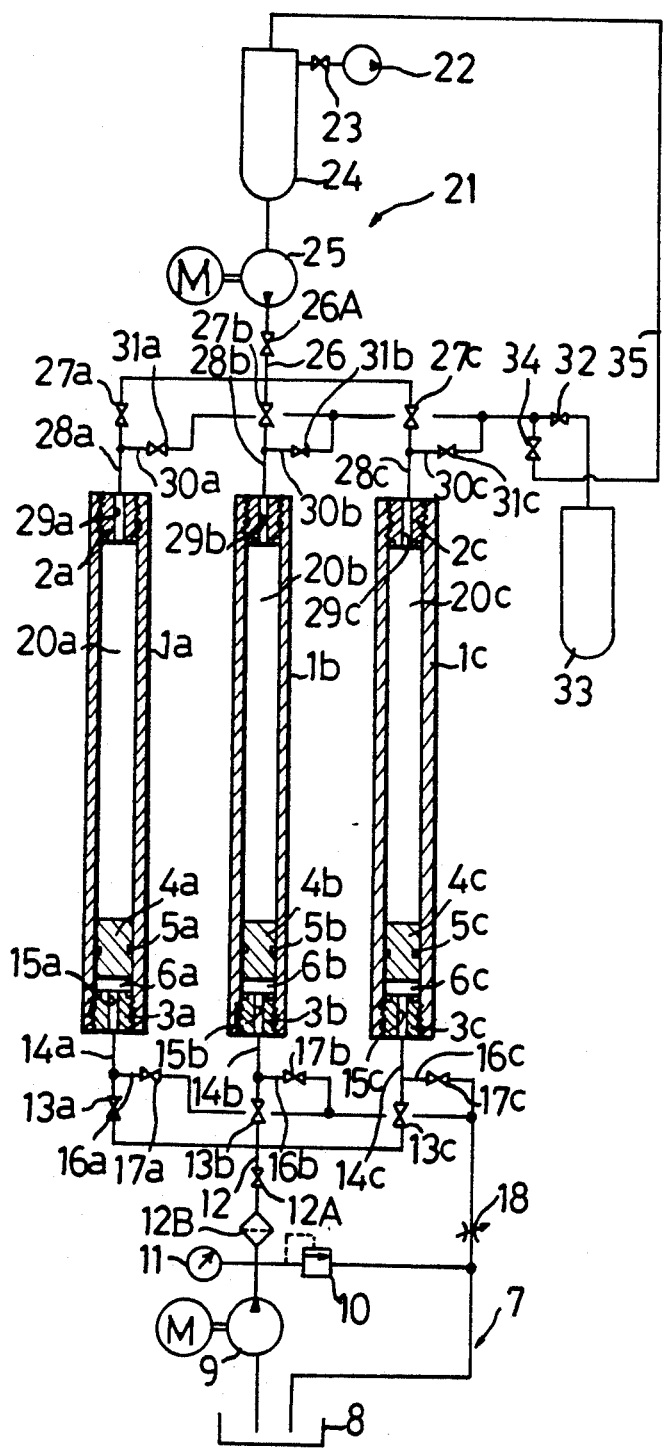
FIG. 3 is an elevation view prior to operation according to a second embodiment of the present invention.

FIG. 3 shows a second embodiment of the present invention. A filter 12B is provided on an outlet of a pressure pump 9, said filter 12B being a membrane filter for removal of germ and sterilization of pressure medium to be pressurized and supplied, thus securing further cleanliness. The filter 12B serves as sterilization means.

In FIG. 3 parts common to those of the first embodiment (FIGS. 1 and 2) previously mentioned have common reference numerals.

Figure 4:
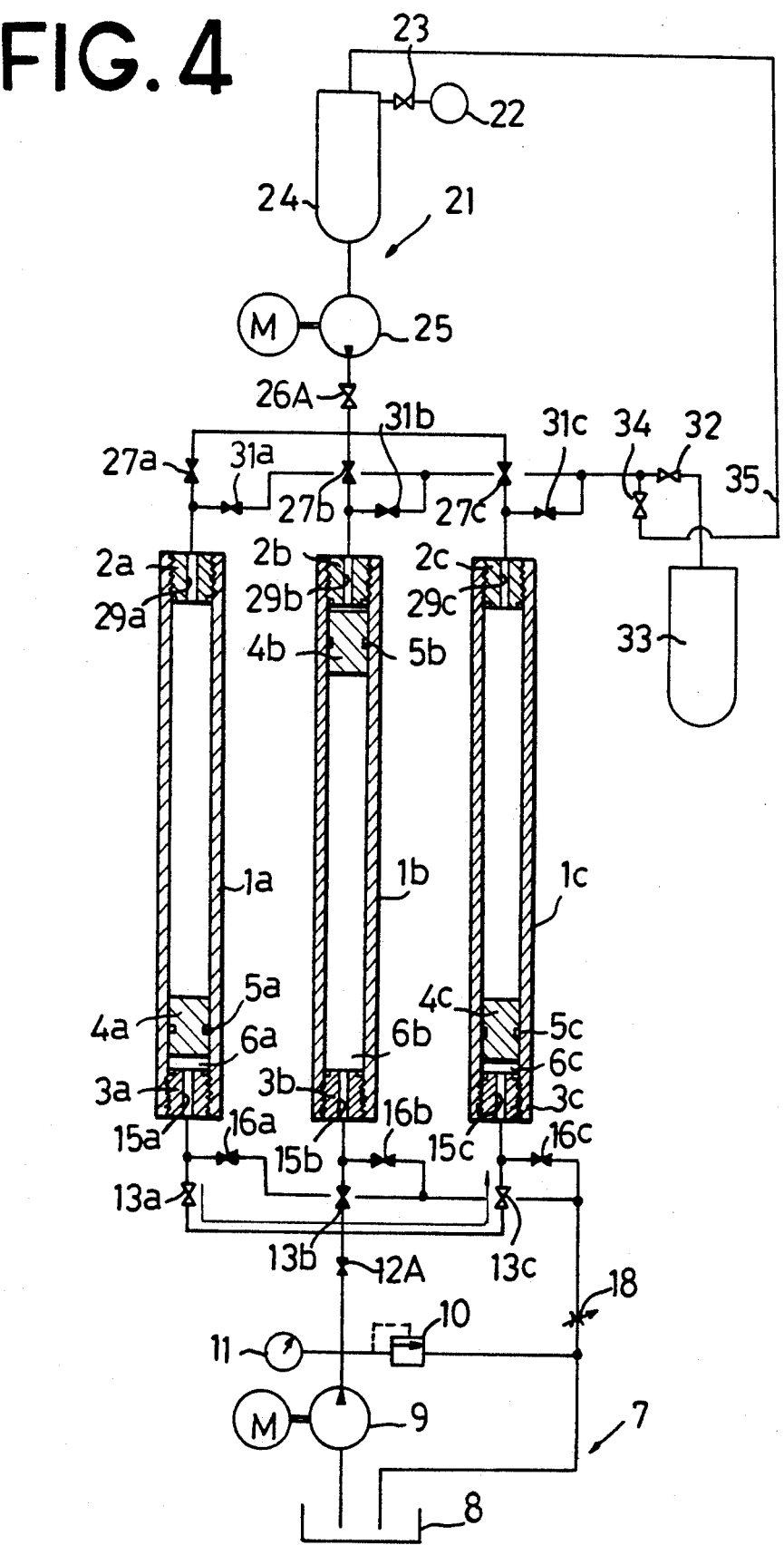
FIG. 4 is an elevation view showing another example of the present invention in the operating state.

Further, FIG. 4 shows another example of the method of the present invention which effectively utilizes pressurized energy. As shown in FIG. 4, when the pressure processing has been terminated in the pressure container 1a, the pressurized energy is not released to open air but is utilized for pressurizing the pressure container 1c to be pressurized next. That is, the pipelines communicated with the pressure containers 1a-1c, and the opening and closing valves 13a-13c, 16a-16c, 27a-27c and 31a-31c are once closed, after which only the opening and closing valves 13a and 13c are opened to use the pressurized energy in the pressure container 1a for pressurization of the pressure container 1c. This is an extremely preferable method for speeding up the pressurization to further shorten the cycle time and extending the life of the pressurizing pump 9.

Also, in FIG. 4, members common to those of the first embodiment are indicated by common reference numerals. In the FIG. 4 embodiment, the sterilization means can be provided similar to the second embodiment.

While in the embodiments illustrated and described above, heat treating means such as heating or cooling means for the pressure containers have been omitted, it is to be noted that these can be suitably provided or not provided. Further, when the heat treating means such as heating or cooling are not equipped, treatment by pressure is exclusively used, which is effective for handling natural fruit juice. Further, one pressure container may be provided, and in case of the continuous batch processing, the number thereof can be increased. Furthermore, while in the illustration, one chambers 6a-6c are provided below while the other chambers 20a-20c are provided above so that pressure medium acts on the chambers 6a-6c while material to be processed is supplied to the chambers 20a-20c, it is to be noted that conversely to the aforementioned illustration, material to be processed is supplied to the lower chambers 6a-6c while the pressure medium acts on the upper chambers 20a-20c. According to this arrangement, in the case where the interior of the pressure containers is cleaned after completion of all operations, if the free piston is removed downwardly to cause water as pressure medium to flow from the top, cleaning can be made, which is advantageous. It is of course sometimes that the pressure contains 1a to 1c are not arranged longitudinally but laterally. The directivity of the pressure containers is free.

As described above, according to the present invention, the pressure container is partitioned by the free piston so that material to be processed is filled into one chamber and pressure medium is supplied to the other chamber whereby sterilization, denaturation, etc. can be made by the pressure processing of food material. In addition, when at least three pressure containers are provided, a series of operations including pressurizing holding, discharge and supply of material to be processed can be carried out in batch continuous manner in the same time zone. Further, water is utilized as pressure medium to thereby secure the cleanliness required for handling food with the result that industrial utilization of pressure processing of food can be further promoted.

What we claim is:

1. A pressure processing apparatus comprising:
   at least three pressure containers,
   a free piston provided within each pressure container, each said free piston being slidable in an axial direction of the container and dividing said container into one chamber and an other chamber,
   a pressure medium supply and discharge device connected in common to each said one chamber partitioned by said free piston, including a common pressure medium supply line, and branch lines connected to said one chamber, an opening and closing valve on each of said branch lines, a pressure medium discharging bypass line connected to each branch line between each of said opening and closing valves and said one chamber, and an opening and closing valve on each said bypass line, and a supply and recovery device for a liquid material to be processed, including a common supply line for the material to be processed, and branch lines connected to each other chamber and the supply common line of the supply device for said material to be processed, an opening and closing valve on each of said branch lines, a recovering bypass line connected to said recovery device in the branch line between each of said opening and closing valves and said other chamber, and an opening and closing valve provided on each bypass line.

2. A pressure processing apparatus for food materials, comprising:

a cylindrical pressure container;

a free piston slidably housed in said pressure container and dividing said container into one chamber and an other chamber;

a liquid food material supply and recovery device, including a tank for a food material to be processed, connected to said other chamber, said liquid food material supply and recovery device further including a line having a pump and connecting said tank to said other chamber, so that a food material can be supplied from the tank to the other chamber;

a pressure medium supply and discharge device, including a pressure medium pump and another line connecting said pressure medium pump to said one chamber, so that the food material in said other chamber can be pressurized by the pressure medium; and valves in said line and said another line for sealing said container for a time sufficient for sterilization of a pressurized food material in said other chamber.

3. The apparatus of claim 2 including three of said pressure containers connected in parallel to said food material supply and recovery device, and to said pressure medium supply and discharge device.

4. A pressure processing apparatus for food materials according to claim 1 or 2, wherein the pressure medium supply and discharge device is provided with sterilization means before the pressure medium is charged into the pressure container.

5. A pressure processing apparatus for food materials according to claim 1 or 2, comprising heat treating means for the material to be processed within the pressure container.

* * * * *

(12) EX PARTE REEXAMINATION CERTIFICATE (4932nd)
United States Patent
Kanda et al.

(10) Number: US 5,228,394 C1
(45) Certificate Issued: May 4, 2004

(54) PROCESSING APPARATUS FOR FOOD MATERIALS

(75) Inventors: Takeshi Kanda, Hyogo (JP); Kazunobu Fujinuma, Tsukuba (JP); Toshikatsu Naoi, Kobe (JP); Yasuhiko Inoue, Kobe (JP); Yoshihiko Sakashita, Kobe (JP); Yoshihisa Sawada, Nishinomiya (JP)

(73) Assignee: Kabushiki Kaisha Kobeseikosho, Kobe (JP)

Reexamination Request:
No. 90/006,514, Jan. 15, 2003

Reexamination Certificate for:
Patent No.: 5,228,394
Issued: Jul. 20, 1993
Appl. No.: 07/785,873
Filed: Nov. 1, 1991

(30) Foreign Application Priority Data

| Nov. 2, 1990 | (JP) | 2-298060 |
| Nov. 22, 1990 | (JP) | 2-320034 |
| Jan. 23, 1991 | (JP) | 3-006534 |

(51) Int. Cl.⁷ .................................. A23L 1/00
(52) U.S. Cl. .................. 99/453; 99/275; 99/467; 99/471; 99/483; 60/910
(58) Field of Search .................. 99/275, 276, 467, 99/468, 471, 472, 473, 474, 475, 483, 484, 485, 452, 453; 422/291, 295; 60/910; 426/521

(56) References Cited

U.S. PATENT DOCUMENTS

| 4,674,267 A | 6/1987 | Szemplenski et al. |
| 4,676,279 A | 6/1987 | von Lersner |
| 4,699,297 A | 10/1987 | Raque et al. |
| 4,792,068 A | 12/1988 | Trygg |
| 4,961,273 A | 10/1990 | Fay |
| 4,992,644 A | 2/1991 | Webb |
| 4,993,598 A | 2/1991 | Groninger |
| 5,050,778 A | 9/1991 | Corrado et al. |

FOREIGN PATENT DOCUMENTS

| JP | 1-314557 | 12/1989 |
| JP | 2-150264 | 6/1990 |
| JP | 2-171172 | 7/1990 |
| JP | 2-231063 | 9/1990 |

*Primary Examiner*—Reginald L. Alexander

(57) ABSTRACT

A pressure processing method and processing apparatus for sterilization, denaturation, etc. of food materials include a free piston fitted in a pressure container so that the free piston is slidable in an axial direction of the container, the pressure container being partitioned by the free piston into two chambers to prevent mixing and contact between a material to be processed and a pressure medium. The material to be processed filled in and supplied to one chamber is pressure-processed by the sliding movement of the piston caused by supplying the pressure medium to the other chamber. Three or more pressure containers, in each of which is fitted a free piston, are provided, and a series of processing operations including pressurizing and holding, discharge and supply of the material to be processed are carried out in a batch continuous manner in the same time zone.

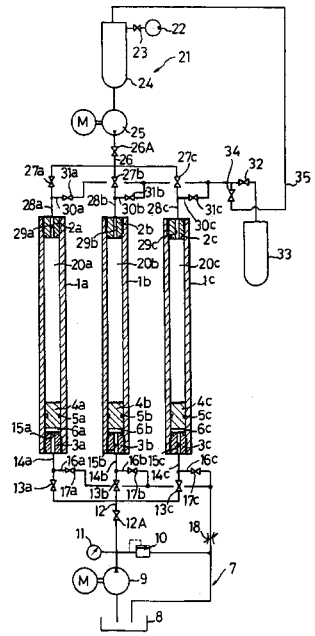

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–5 is confirmed.

* * * * *